Feb. 6, 1934. P. M. MILLER 1,946,171
MOTOR VEHICLE WHEEL CONSTRUCTION
Filed Aug. 22, 1929 3 Sheets-Sheet 1
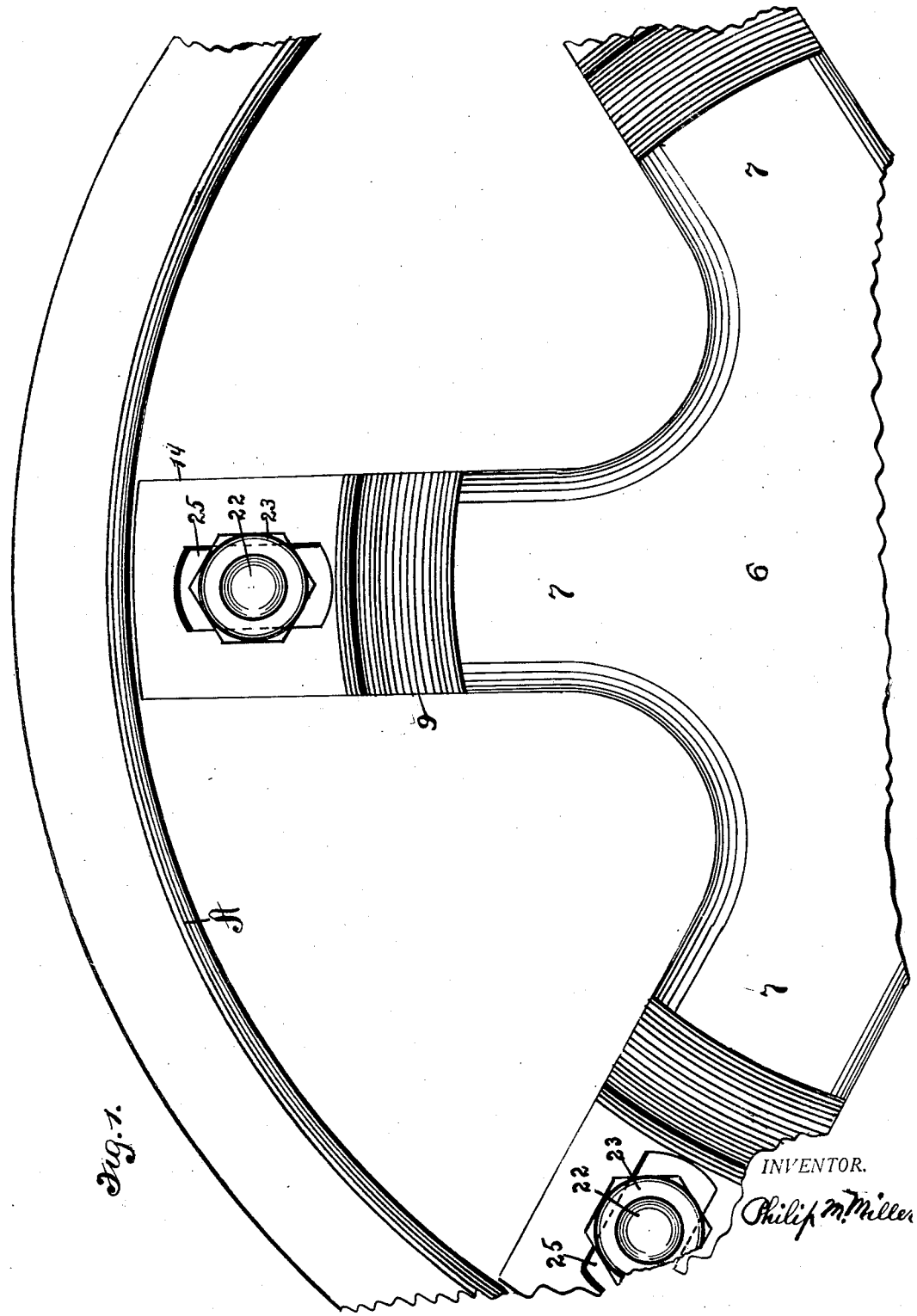
INVENTOR.
Philip M. Miller

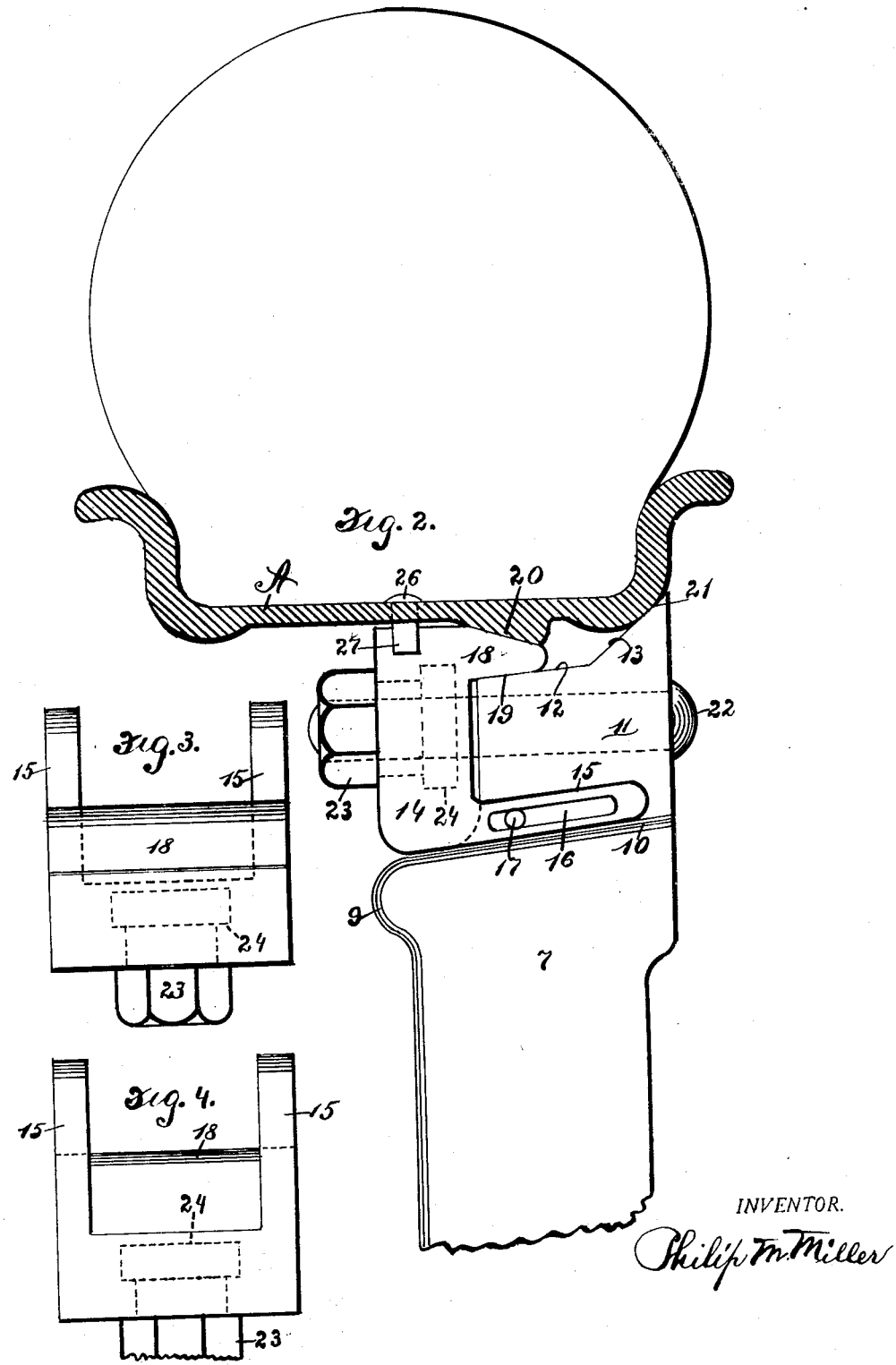

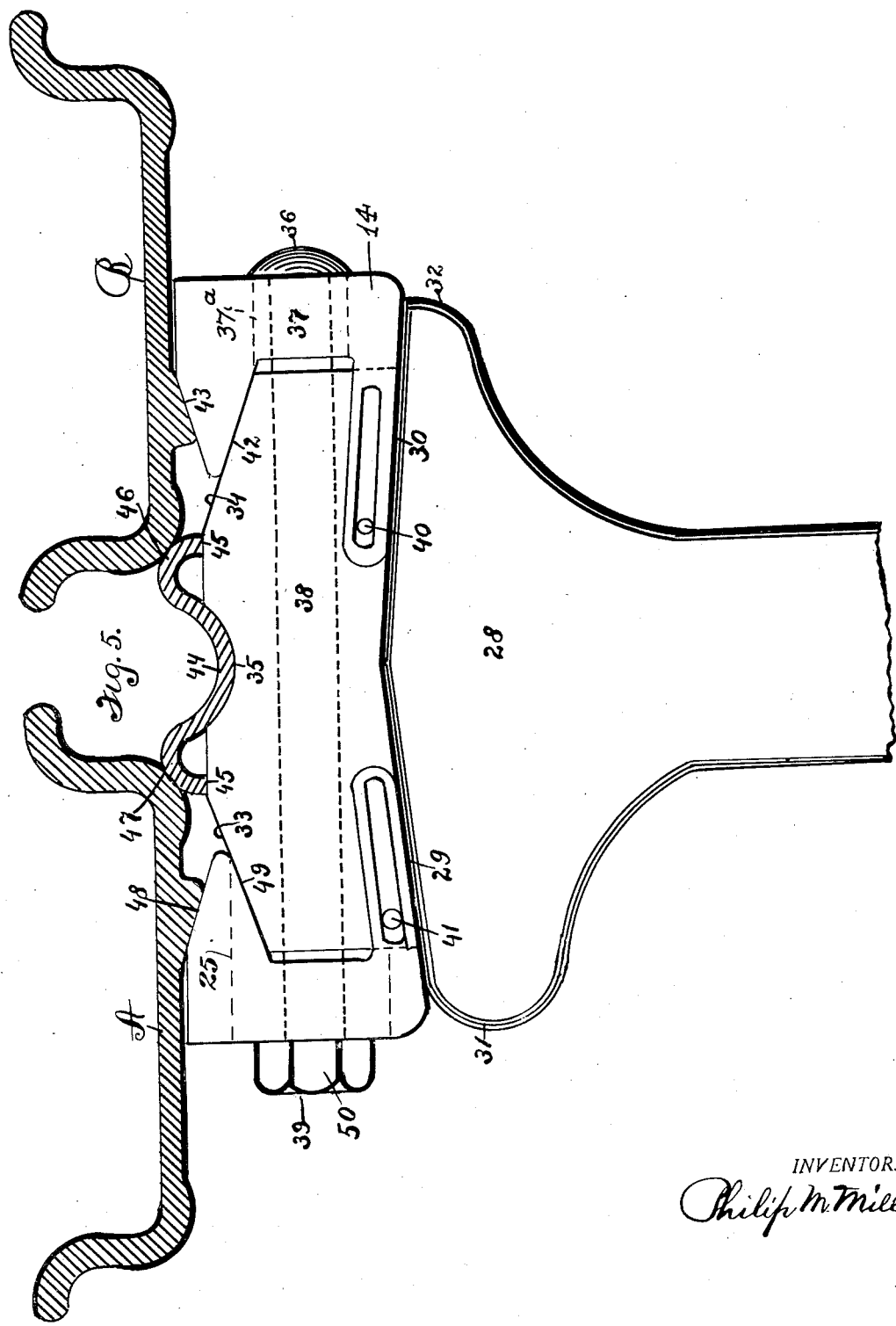

Patented Feb. 6, 1934

1,946,171

UNITED STATES PATENT OFFICE 1,946,171

MOTOR VEHICLE WHEEL CONSTRUCTION

Philip M. Miller, Youngstown, Ohio, assignor to Miller Devices Inc., New York, N. Y., a corporation of New York Application August 22, 1929. Serial No. 387,776

5 Claims. (Cl. 301—12)

This invention relates to improvements in truck single rim and dual rim wheel constructions of that type having demountable tire rims in supported relation with a wheel spider, and the invention particularly comprises means by which the tire rims are applied to and fastened in place upon the outer periphery of the spider members.

The structure herein disclosed may be considered in the nature of an improvement on the structure disclosed in my copending application 375,726, filed July 3, 1929.

The object of this invention is to provide a simple expedient in connection with the outer ends of the spokes of a spider wheel for tightening the tire rims in place thereon, and which will not necessarily become detached from the spider spokes when the tire rim is removed; and to so arrange the fastening means in connection with the ends of the spider spokes as to facilitate the mounting and demounting of dual tire rims upon a single spider construction.

Another object of the invention is to provide means in connection with the outer spoke ends of a single wheel construction and outer spoke ends of a dual wheel construction for carrying interchangeably tire rims of that type of rims which are manufactured by other rim manufacturers, which are obtainable in open market.

Another object of the invention is to provide means operative in connection with the outer spoke ends of the spider whereby the tire rims on the dual structure are moved towards one another for their locking with the wheel in a true alignment in relation with a split spacer member between the rims, and whereby the tire rims are unlocked and permitted to be moved away from engagement with the spacer member for their removal from the wheel.

Another object of the invention is to provide means with the outer spoke ends of the spider and means with the spacer member for removably seating the spacer member on the central portion of the outer spoke ends of the spider in order to provide a rigid engagement therebetween to afford a rigid support for the tire rims when they are locked on the wheel, thus preventing lateral movement of the spacer member when in position on the wheel.

The nature and other objects of the invention will be better understood from a description of the particular embodiment thereof for the purpose of which description reference should be had to the accompanying drawings forming a part hereof and in which—

Fig. 1 is a side elevation of a fragmental portion of a wheel construction embodying my invention applied thereto;

Fig. 2 is a cross section of Fig. 1, with the inner portion of the spoke member broken;

Fig. 3 is a top view of one of the locking clamps;

Fig. 4 is a bottom view of the same locking clamp; and

Fig. 5 is a cross section of a dual rim spider construction carrying two demountable rims.

The invention in the form illustrated in Figs. 1, 2, 3 and 4 is designated by corresponding characters referring to parts thereof and the respective construction consists of a spider 6 having spokes 7, which may be of U-shape in cross section. The outer head 8 of each spoke 7 is provided with a swell 9 formed at the outer face thereof, which is merged with the side inclines 10 to provide an inclined seat on each side and an inclined seat at the front thereof. Extending outwardly is a head 11 formed integrally with the side inclines 10 on each radial arm 7, the head 11 being provided with an inclined face 12 which continues to and merges with an inclined face 13 which is of a degree greater than the incline 12. A U-shaped clamp member 14 is provided with parallel spaced arms 15 and a wedge portion 18, the spaced arms 15 being formed of an angle corresponding to the degree of the inclines 10. Each arm 15 is provided with a longitudinal slot 16 wherethrough passes a pin 17 rigidly fixed in the side of the head 11 to hold the respective clamp member in seating position and for unremovable sliding in relation to the inclines 10. The wedge portion 18 of member 14 is as shown sliding upon the front incline 19 on the head 11 whenever the same is operated for locking and unlocking the rim A on the wheel, as shown at 20 and 21, the wedge portion 18 seating between the bead of the rim and incline of the head and forcing the rim into wedging engagement on the incline 13. A bolt 22 is fixed in each head 11 and extends outwardly to be in threaded engagement with the nut member 23 which is held in permanent engagement with the front wall of member 14 by the collar 24 and which is adapted for sliding engagement between the walls or sides of the slot 25 as shown in Fig. 1. The arms 15 of each member 14 are also adapted to have a driving connection with the head 11 of the wheel whenever the wheel construction is moving under load on the road. The base of the rim is provided with a rigid member 26 inwardly extended and engaging each side of member 14 as shown at 27 to secure the rim for driving in relation with the wheel under load on the road.

Member 14, as shown, is positioned on the side inclines 10 and held permanently in relation with each outer spoke end for sliding thereon when the rim is mounted on and demounted from the outer spoke ends of the spider structure. When the nut member 23 having permanent engagement with the front part of member 14 for free sliding between the sides of the slot therein as hereinbefore described, is threadedly operated in relation with the bolt 22, member 14 as a whole is moved on the inclines 10 of the spokes 7 and is controlled by the fixed pins 17 from accidental displacement from the outer spoke end, when it is disengaged with the bolt for permitting the removal of the rim from the wheel. The member 14 with nut 23 is moved angularly, downwardly on the inclines 10 to provide necessary clearance for removal and replacing the rim on the wheel, when the nut member is disengaged with the bolt.

When the nut 23 is threadedly operated in relation with the bolt 22, the member 14 as a whole is moved angularly upward on the inclines 10 into engagement with the bead 20 of the rim and incline 19 of the outer spoke end, thus forcing the rim into wedging engagement with the inclined portion 13 as shown at 21, the wedge portion 18 being then engaged between the incline 19 and bead 20, while the opposite portion of the member is in engagement on the entire surface of the inclines 10.

It is obvious that as a result of mounting the rim as shown, the rim is wedged at two spaced points, and when the member 14 with its operable nut 23 is disengaged with the bolt 22 and angularly, downwardly moved out of position, the previously wedged rim drops down from position for removal from the wheel, without effort or exertion on the part of the user of the vehicle equipped with the rim.

The bearing faces on the wedge portions of the clamp members and the bearing faces on the heads of the spokes are provided in the manner such that any type of the conventional demountable rims may be fitted thereon for rigidly locking one with another.

Clamp member 14 is constructed in the manner such that it is interchangeable for operation in connection with the mountings of the dual demountable rims A and B shown in Fig. 5, on the heads of the spokes 28 of the dual spider wheel.

In connection with this construction each head is provided with convergingly inclined side seats 29 and 30 one meeting the other at the center point of the spoke, thereby providing means whereby the members 14 are aligned in relation to the sides of each head for sliding engagement whenever the clamp members are moved into threaded engagement and disengagement with the bolts 36.

Each spoke 28 is provided with oppositely extended swells 31 and 32. Each swell is continuous with its adjacent inclined seat to provide a front and a rear seat each adapted to support one of the positioned clamp members. The sides of the peripheral face of each head of the spokes 28 are provided with an incline 33 and an incline 34 both upwardly extending towards one another to terminate in an intermediate face whereupon a concave seat 35 is formed. A bolt 36 is permanently associated with the inner clamp member indicated at 37, which freely passes through a suitable opening provided in the body 38 of each head of the spokes 28, to permit movement of the bolt with the fixed clamp member, laterally, toward and from the outer side of the wheel construction. The clamp member 37 is slotted as at 37a to permit limited radial movement of said member during the rim-mounting and demounting operation.

The clamp members as shown are permanently secured on the side seats 29 and 30 by means of the pins 40 and 41 each fixed in the sides of each head of the spokes 28 and passed through the slot formed in each arm of the clamp members.

The pin 40 is fixed in the side of the head of the spoke 28 and passes through each slot of the member 37 in adjacence to the inner end thereof in the manner such that to permit slightly inner lateral movement of the respective member after the mounted parts on the wheel have been unlocked, necessary only to disengage the inner rim therefrom, but free, unlimited lateral, outward movement is provided to move the respective member towards the center line of the spoke for wedging engagement with the bead 43 of the rim B and outer face 42 of the head of the spoke. The pin 41 is fixed in the side of the head of the spoke 28 and passes through each slot of the front clamp member in adjacence to the outer portion thereof in the manner such that to permit freely outer lateral movement of the respective member after the mounted parts on the wheel have been unlocked, which is necessary to provide clearance for removal of the spacer 44 and rim A, but unlimited lateral, inward movement is provided to move the respective member towards the center line of the spoke for wedging engagement with the bead 48 of the rim A and outer face 33 of the head of the spoke 28.

In order to lock the rims on the wheel construction the rim B is positioned on the inner clamp member with the bead on the incline 43, then the split annular member 44 is positioned in the cavity 35 with the sides 45 on the sides of the intermediate portion of the radial spokes 28, the side 46 of the rim being upon the side portion of the split member, and then the rim A is positioned on the wedge portion of the outer clamp member with the bead on the incline 48 of the clamp member, the side 47 of the rim being upon the side portion of the split member. In this position the assembly is tightened by action of the nut 50 on the threads 39, drawing the clamp members into wedging engagement with the beads of the rims and the inclined faces of the head of the spoke and the rims on the sides of the split spacer, and thereby providing a rigid, true alignment of the rims with the spacer, in relation to the center line of each of the spokes.

When the movement of nut member 50 is reversed each clamp member is moved in opposite directions and the rims are released from wedging engagement, the outer clamp member being outwardly moved on the inclines 29 thus providing clearance to permit the outer rim to pass by the outer periphery thereof, while the inner clamp member is moved laterally to be disengaged from the bead of rim B and inclined surface 42 of the head of the spoke, thereby freeing it for removal from the wheel after the split spacer is pried off the wheel.

It is to be understood that each rim is drawn towards the mounted split spacer member which is secured removably at the center of the spokes by means of the nut member 50 threadedly operated on the threads of the bolt for the purpose of providing a true, rigid locking alignment of the rims in relation to the center line of the outer heads of the spokes.

By means of the engagement of the side arms of the clamp members with the sides of the heads of the spokes 28, a driving connection is provided between the members and spokes of wheel spider.

It is understood that the split annular spacer member is engaged in the cavity of each spoke 28 for the purpose of preventing lateral movement in relation to the heads of the spokes of wheel spider, and to provide a rigid engagement with the rims supported by the side arms of the spacer member.

With the foregoing description of construction of the principles of the invention, it is understood that the latter is susceptible to a wide range of modification, variation and substitution without departing from the scope and spirit of the claims.

Having thus described my invention, what I desire to secure by Letters Patent is:

1. In a wheel assembly for motor vehicles, the combination with a tire rim, of a rim-clamping device which is substantially bifurcated in form and provided with a wedge portion and substantially parallel spaced arms, a spider member having a free spoke end which terminates in a reduced end portion forming a ledge adapted to support the rim-clamping device and provide bearing surfaces for the said arms, the periphery of the reduced end portion forming a bearing surface for said wedge portion and the tire rim, and a clamping bolt passed through the rim-clamping device and reduced end portion of the spoke.

2. In a wheel assembly for motor vehicles, the combination with a tire rim, of a rim-clamping device which is substantially bifurcated in form and provided with a wedge portion and substantially parallel spaced arms, a spider member having a free spoke end which terminates in a reduced end portion forming a ledge adapted to support the rim-clamping device and provide bearing surfaces for the said spaced arms, the periphery of the reduced end portion forming a bearing surface for said wedge portion and the tire rim, a clamping bolt passed through the rim-clamping device and reduced end portion, and means for holding the clamping device in transverse sliding association with the reduced end portion of the spoke.

3. In a wheel assembly for motor vehicles, the combination with a tire rim, of a rim-clamping device which is substantially bifurcated in form and provided with a wedge portion and substantially parallel spaced slotted arms, a spider member having a free spoke end which terminates in a reduced end portion forming a ledge adapted to support the rim-clamping device and provide bearing surfaces for the said spaced arms, the periphery of the reduced end portion forming a bearing surface for said wedge portion and the tire rim, a clamping bolt passed through the rim-clamping device and reduced end portion of the spoke, and a pin secured transversely in the lower portion of the said reduced spoke end and projecting into the slots formed in said arms.

4. In a wheel assembly for motor vehicles, the combination with a tire rim, of a rim-clamping device which is substantially bifurcated in form and provided with a main body portion, a wedge portion formed with an inclined bearing surface for the rim and substantially parallel spaced slotted arms, a spider member having a free spoke end which terminates in a reduced end portion forming inclined front and side seats for the body portion and parallel arms of the rim-clamping device, the peripheral surface of the reduced end portion being formed with an inclined bearing seat for the said wedge portion, a pin fixed transversely in the lower portion of the said reduced end portion and projecting through the slots formed in said arms, and a locking bolt passed through the reduced end portion of the spoke and body portion of the clamping device.

5. In a wheel assembly for motor vehicles, the combination with a tire rim, of a rim-clamping device which is substantially bifurcated in form and provided with a main body portion, a wedge portion formed with an inclined bearing surface for the rim and substantially parallel spaced slotted arms, a spider member having a free spoke end which terminates in a reduced end portion forming inclined front and side seats for the body portion and parallel arms of the rim-clamping device, the peripheral surface of the reduced end portion being formed with an inclined bearing seat for the said wedge portion, a pin fixed transversely in the lower portion of the said reduced end portion and projecting through the slots formed in said arms, a locking bolt passed through the reduced end portion of the spoke and body portion of the clamping device, and an undetachable nut pivotally mounted in the body portion of the clamping device.

PHILIP M. MILLER.